US008799335B2

(12) United States Patent
Eshel et al.

(10) Patent No.: US 8,799,335 B2
(45) Date of Patent: Aug. 5, 2014

(54) SUPPORTING COORDINATED ACCESS TO A FILE SYSTEM'S SHARED STORAGE USING AUTOMATIC ALIGNMENT OF A PARALLEL FILE ACCESS PROTOCOL AND METADATA MANAGEMENT

(71) Applicant: International Business Machines Corporation, Armonk, NY (US)

(72) Inventors: Marc Eshel, San Jose, CA (US); Dean Hildebrand, Sumas, WA (US); Frank B. Schmuck, Campbell, CA (US); James C. Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 13/630,861

(22) Filed: Sep. 28, 2012

(65) Prior Publication Data

US 2014/0095459 A1 Apr. 3, 2014

(51) Int. Cl.
*G06F 17/30* (2006.01)

(52) U.S. Cl.
CPC ................................ *G06F 17/30079* (2013.01)
USPC ........................................................ 707/826

(58) Field of Classification Search
CPC .......... G06F 17/30067; G06F 17/3007; G06F 17/30079; G06F 17/30091; G06F 17/30115; G06F 17/30132; G06F 17/30165
USPC .......................... 707/703, 764, 822, 825, 826
See application file for complete search history.

(56) References Cited

U.S. PATENT DOCUMENTS

| | | | |
|---|---|---|---|
| 5,987,506 A | 11/1999 | Carter et al. | |
| 6,985,914 B2 * | 1/2006 | Venkatesh et al. | ..................... 1/1 |
| 7,272,613 B2 * | 9/2007 | Sim et al. | ....................... 709/223 |
| 7,272,654 B1 * | 9/2007 | Brendel | ........................ 709/229 |
| 7,562,110 B2 * | 7/2009 | Miloushev et al. | ............ 709/201 |
| 7,730,057 B2 | 6/2010 | Bell et al. | |
| 7,739,301 B2 * | 6/2010 | Bojinov et al. | ................ 707/782 |
| 7,877,511 B1 * | 1/2011 | Berger et al. | .................. 709/242 |
| 7,966,343 B2 | 6/2011 | Yang et al. | |
| 8,095,577 B1 * | 1/2012 | Faibish et al. | ................. 707/823 |
| 8,510,265 B1 * | 8/2013 | Boone et al. | ................... 707/609 |

(Continued)

OTHER PUBLICATIONS

IBM, Method for Easy Statistical View of Storage Disk Technology in Storage Servers and Virtulized Storage Farms, published in IP.com, Inc., IPCOM000188346D, Oct. 1, 2009, pp. 1-4.

(Continued)

*Primary Examiner* — Cam-Linh Nguyen
(74) *Attorney, Agent, or Firm* — Mohammed Kashef (57) ABSTRACT

Embodiments of the invention relate to supporting coordinated access to a file system's shared disk storage subsystem using an automatic alignment of a parallel file access protocol and metadata management on a per object basis. A file server (among servers in the cluster) receives a client's request to access a file stored by the file system in the storage subsystem using a parallel file access protocol. If the file system has selected a file server to serve as a metadata manager of said file, the file server uses the selected file server to coordinate access to the file's metadata. If the file system has not selected a file server to serve as the metadata manager of the file, the file system selects the file server that received said request as the metadata manager for said file until a file close request operation is received.

17 Claims, 6 Drawing Sheets

(56) References Cited

U.S. PATENT DOCUMENTS

| | | | |
|---|---|---|---|
| 8,589,550 B1* | 11/2013 | Faibish et al. | 709/226 |
| 2003/0220974 A1* | 11/2003 | Curran et al. | 709/205 |
| 2009/0106255 A1* | 4/2009 | Lacapra et al. | 707/10 |
| 2010/0293140 A1 | 11/2010 | Nishiyama | |
| 2011/0222442 A1 | 9/2011 | Cole et al. | |
| 2012/0311065 A1* | 12/2012 | Ananthanarayanan et al. | 709/213 |

OTHER PUBLICATIONS

R. Alimi et al., "A Survey of In-Network Storage Systems (RFC6392)", published in IP.com, Inc., IPCOM000213091D, Oct. 1, 2011, pp. 1-89.

Yin Wang et al., "Proportional-Share Scheduling for Distributed Storage Systems", 5th USENIX Conference on File and Storage Technologies (FAST'07), Feb. 2007, pp. 1-14.

* cited by examiner

SUPPORTING COORDINATED ACCESS TO A FILE SYSTEM'S SHARED STORAGE USING AUTOMATIC ALIGNMENT OF A PARALLEL FILE ACCESS PROTOCOL AND METADATA MANAGEMENT

CROSS-REFERENCE TO RELATED APPLICATIONS

This application is related to commonly assigned U.S. patent application Ser. No. 13/630,754 entitled "COORDINATED ACCESS TO A CLUSTERED FILE SYSTEM'S SHARED STORAGE USING SHARED-LOCK ARCHITECTURE," and U.S. patent application Ser. No. 13/630,684 entitled "COORDINATED ACCESS TO A FILE SYSTEM'S SHARED STORAGE USING DYNAMIC CREATION OF FILE ACCESS LAYOUT," both of which are filed concurrently with the present application and incorporated herein by reference in their entirety.

BACKGROUND

Embodiments of the invention relate to the field of data storage, and in particular, to supporting coordinated access to the file system's shared disk storage subsystem using an automatic alignment of a parallel file access protocol and metadata management on a per object basis.

Data access in cloud architectures is beginning to center around scale out storage systems. For example, IBM SONAS™ (Scale Out Network Attached Storage™) is a storage scale out NAS offering designed to manage vast repositories of information in enterprise cloud computing environments requiring very large capacities (e.g., petabytes), high levels of performance, and high availability. IBM SONAS is built using the IBM General Parallel File System™ (GPFS™), a clustered file system high-performance enterprise file management platform that supports scalable and parallel cluster computing. The scale out storage systems thereby allows applications to access a single file system, storage device, single portion or data, or single file through multiple file servers in a cluster.

Third-party file access protocols are commonly used for remote access to file system data (e.g., FTP and HTTP). Most of these protocols are client-server based, with a single client accessing a single storage server. These protocols strangle the scalability of scale-out storage systems, and frequently cause data access bottlenecks, by limiting access to a single server. Coordinated and parallel file access protocols have been developed to simultaneously access multiple file servers in a remote cluster. These protocols help relieve storage bottlenecks, but their access must be coordinated by the storage system to maintain data access semantics (e.g., POSIX) and avoid corruption.

Parallel Network File System (pNFS) is a standardized parallel file access protocol extension of Network File System (NFS) protocol. pNFS is expected to be supported in most scale out storage systems in the future. pNFS, an integral part of NFSv4.1, transforms NFSv4 into a heterogeneous metadata protocol. pNFS clients and servers are responsible for control and file management operations, but delegate I/O functionality to a storage-specific layout driver on the client. pNFS clients can fully saturate the available bandwidth of the parallel file system by separating control and data flows. Each storage system may support pNFS or any similar parallel file access protocols in different ways. For example, to determine a specific file layout for I/O access, each storage system will have unique ways of creating an optimal layout to reduce latency and maximize I/O throughput.

BRIEF SUMMARY

Aspects of the invention includes a method, clustered file system, and computer program product supporting coordinated access to the file system's shared disk storage subsystem using an automatic alignment of a parallel file access protocol and metadata management on a per object basis. The file system includes a cluster of plurality of file servers where active file servers in the cluster have equivalent access to shared data of the file system. The file system further includes a shared disk storage subsystem that stores said file system's shared data.

In one embodiment, a file server (among servers in the cluster) receives a client's request to access a file stored by said file system in the storage subsystem using a parallel file access protocol. If the file system has selected a file server to serve as a metadata manager of said file, the file server uses the selected file server to coordinate access to the file's metadata. If the file system has not selected a file server to serve as the metadata manager of the file, the file system selects the file server that received said request as the metadata manager for said file until a file close request operation is received.

The file server then performs a file open request operation for the file, to the file server selected to serve as the metadata manager. The file server then opens the file and creates a file handle of the file. The file server then encodes a file server ID, of the file server selected as the metadata manager of said file, in the file handle such that the file system's file servers may identify which file server is the file's metadata manager. The file server then returns the file handle to the client for performing I/O to said file.

Details of the embodiments of the invention are described below in the Detailed Description section in reference to the accompanying drawings. The Brief Summary is intended to provide an overview of the claimed subject matter and is not intended to limit the scope of the claimed subject matter. Other features and advantages of this invention will become apparent from the following Detailed Description.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

The following Detailed Description of the embodiments of the system, method, and computer program product of the present invention, as presented in the Figures, is not intended to limit the scope of the invention, as claimed, but is merely representative of selected embodiments of the invention. The architecture of the present invention, as generally described and illustrated in the Figures herein, may be arranged and designed in a wide variety of different configurations. Thus, the following Detailed Description is intended only by way of example, and simply illustrates certain selected embodiments of systems and processes that are consistent with the invention as claimed herein.

Embodiments of the invention provide a method, clustered file system, and computer program product of supporting coordinated access to a file system's shared disk storage subsystem using an automatic alignment of a parallel file access protocol and metadata management on a per object basis. In one embodiment, the claimed invention provides multiple file system metadata server support. For example, a file system (e.g., GPFS™) implementing embodiments of the invention can define as many file system metadata servers as there are file servers in the clustered file system, which thereby allows parallel file access protocol clients (e.g., pNFS) clients to mount different file system metadata servers. In doing so, the metadata management can be distributed across all file system servers, even for a single export.

In another embodiment, the claimed invention provides for automatic alignment of parallel file access protocol and file system metadata management on a per object basis. For instance, a server dynamically becomes the metadata manager for that object when a parallel file access protocol (e.g., pNFS) client mounts an server and begins to access an object. As a result, network delays of having to interact with a separate metadata management server are eliminated. In addition, once that client finishes accessing that object, another client may begin to access the same object from another file server. The metadata manager for that object dynamically migrates to the new server.

Figure 1:
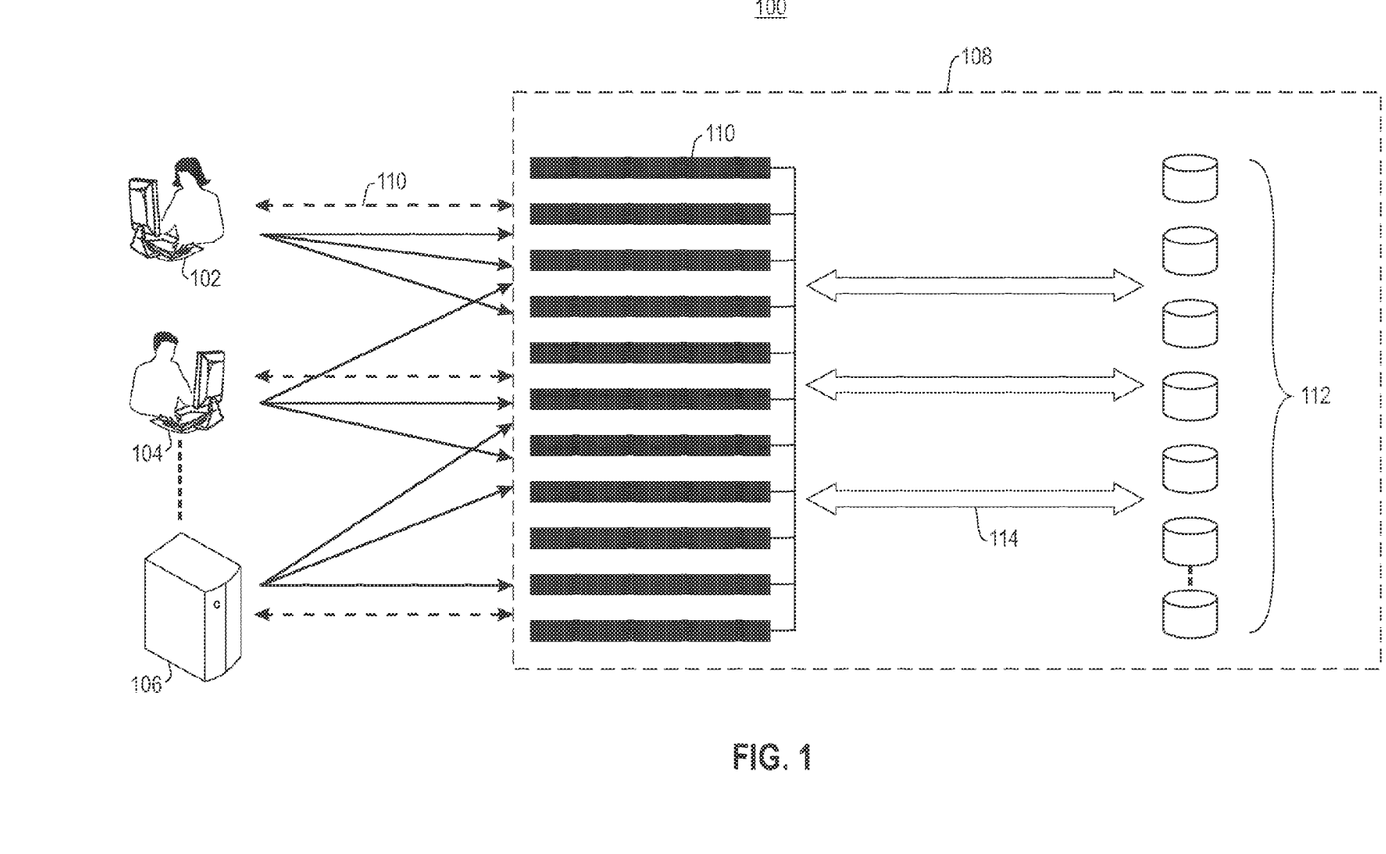
FIG. 1 depicts a diagram illustrating an exemplary file server cluster for running a clustered file system with parallel access to shared storage that implements embodiments of the invention, according to one embodiment.

In another embodiment, to implement flexible file system layout creation, a novel encoding scheme is used to optimize the identification of owner of the file access layout on each I/O to the file system FIG. 1 depicts a diagram (100) illustrating an exemplary file server cluster (108) (hereinafter "cluster") for running a clustered file system (hereinafter "file system") with parallel access to a shared storage subsystem (112) (hereinafter "storage subsystem") that implements embodiments of the invention, according to one embodiment. The file system supports coordinated access to the file system's storage subsystem using dynamic creation of file access layout for different workloads and access patterns. The diagram includes file based parallel file access protocol clients (e.g., pNFS) (102, 104 . . . 106) that remotely access the file system (hereinafter "clients"). For example, the clients may include a parallel file access protocol AIX® client (102), a WINDOWS client (104), and a Linux client (104). The clients send and receive data and metadata to and from the cluster over a network (108) (e.g., wide-area network (WAN)).

The cluster includes a plurality of servers (110), including but not limited to state, data, or storage servers (hereinafter "file servers"), working in parallel to serve the file access protocol clients' I/O requests. The "file servers" may include any server (or virtual server) that is part of the storage system and can be used by external applications to access data stored in the storage system. For example, file servers include servers (e.g., IBM System x® servers) configured to support file access protocol client access to a file system's storage. The cluster further includes a storage subsystem (112). In one embodiment, the storage subsystem is scalable (e.g., scale-out storage system). For example, scale-out storage system NAS solutions such as IBM SONAS™, IBM XIV® and IBM Storwize® V7000 disk systems that support over 7,000 disk drives. The file servers are in communication with the storage subsystem over a network (114) (e.g., local area network (LAN) or fiber channel (FC)).

Figure 2:
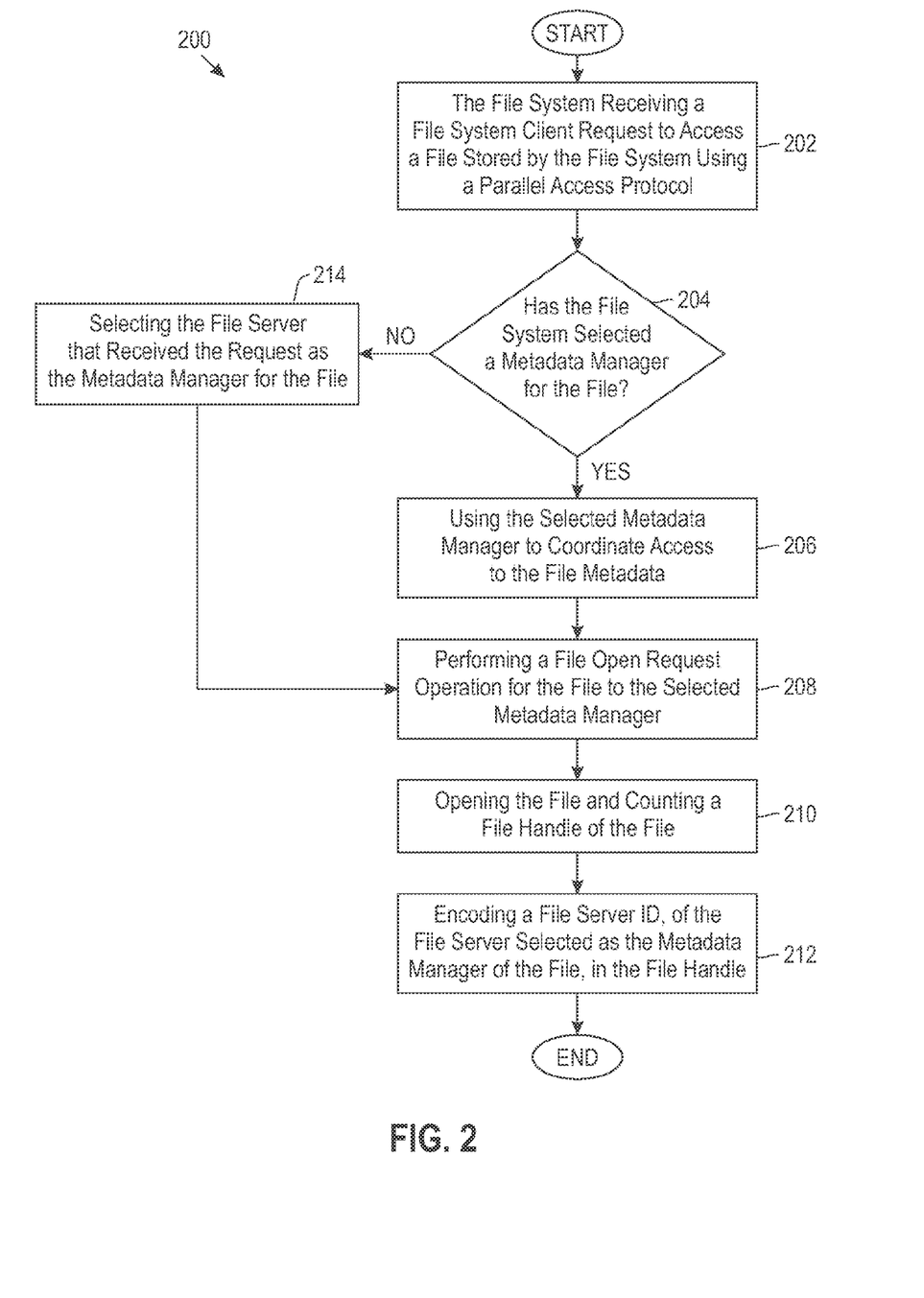
FIG. 2 depicts a flowchart illustrating a process for a clustered file system to support coordinated access to a file system's shared disk storage subsystem using an automatic alignment of a parallel file access protocol and metadata management on a per object basis, according to one embodiment.

FIG. 2 depicts a flowchart illustrating a process (200) for ta file system to support coordinated access to ta file system's storage subsystem using an automatic alignment of a parallel file access protocol and metadata management on a per object basis, according to one embodiment. The file system, and specifically a particular file server among the file servers in the cluster, receives a client request, for access to a file (hereinafter "the file") stored by the file system in the storage subsystem, using a parallel file access protocol (step 202). The file particular server (hereinafter "the file server") determines whether the file system has selected a file server (in the cluster) to serve as a metadata manager of the file (step 204).

If the file system has selected a file server as the metadata manager for the file, then the file system uses the selected file server to coordinate access to the file's metadata (step 206). The file server performs a file open request operation for the file, to the file server selected to serve as the metadata manager (step 208). The file server then opens the file and creates a file handle of the file (step 210). The file server then encodes a file server ID, of the file server selected as the metadata manager of the file, in the file handle (step 212). The encoding is performed such that the file system's file servers may identify which file server is the file's metadata manager. The file server then returns the file handle to the client for performing I/O to the file (step 214).

In another embodiment, if the file server is not the metadata manager and a metadata manager already exists for the file but no clients have the file open, the file system migrates metadata management from a file server (previously selected as the metadata manager of said file) (hereinafter "the selected file server") to a file server in the cluster that at least one client has the file open from. If the file system has not selected a metadata manager for the file, the file system selects the file server as the metadata manager for the file (step 208). The file system by having a metadata manager selected thereby allows clients to access different metadata managers for different files, such that metadata management can be distributed across the file system's file servers. The process then proceeds to steps 208, 210, and 212 (described infra).

In one embodiment, the file system receives a metadata access request for the file's metadata from the client. In this embodiment, the file system coordinates the access for the file's metadata through the server selected as the metadata manager.

Figure 3:
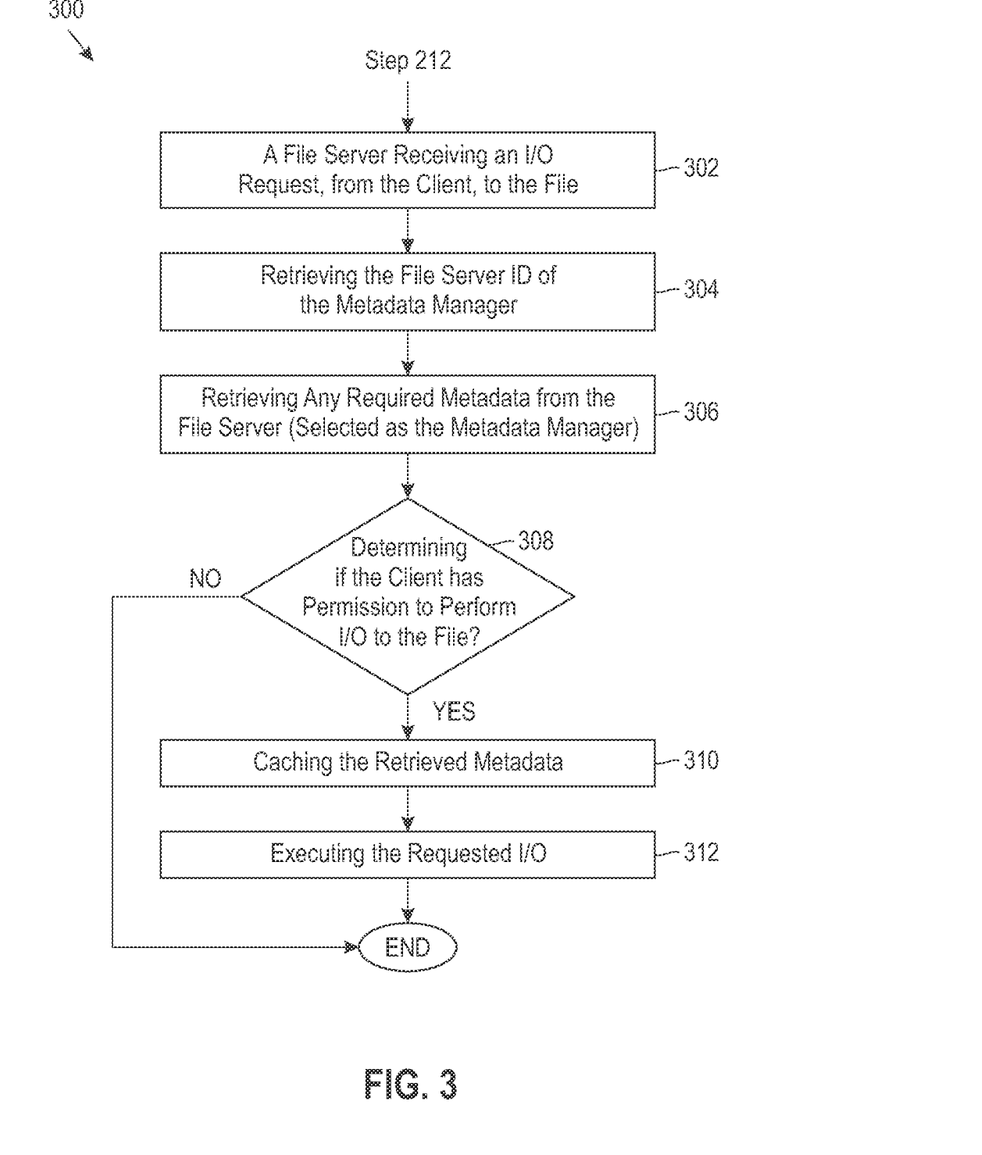
FIG. 3 depicts a flowchart illustrating a process for a clustered file system with parallel access to shared storage to serve an I/O request received from a file based parallel file access protocol client, according to one embodiment.

FIG. 3 depicts a flowchart illustrating a process (300) for the file system, with parallel access to shared storage, to serve an I/O request received from a client, according to one embodiment. A file server in the cluster receives an I/O request from the client (hereinafter "the I/O file server"), to the file (step 302). The I/O file server retrieves the file server ID of the metadata manager (step 304). In one embodiment, the file server retrieves the file server ID of the metadata manager by decoding the file handle (step 304).

The I/O file server then retrieves any required metadata from the selected file server (step 306). The file system then determines if the client has permission to perform I/O to the file using the retrieved metadata (step 308). The client does not have the permission if either access control fails for a user of the client, or the client attempts to perform a type of operation different from what access was granted (i.e., not in accordance with file system security policies). The process ends of the client does not have access and proceeds if the client does have access. If the client has permission, the I/O file server then caches the retrieved metadata (step 310). The I/O file server then executes the requested I/O request (step 312).

In another embodiment, if the client requests to close file, the file server that received the close request, uses an inter-node communication mechanism to remove cached metadata on the file servers.

In one embodiment, the claimed invention provides for multi-node client file creates. For example, clients can create files in a single directory via different metadata managers. In current systems file creation would need to be coordinated with a single metadata manager, reducing performance. Using embodiments of the invention, a file system file access protocol file creation can scale metadata-intensive workloads such as file create with the number of available file system file servers.

In another embodiment, the claimed invention provides support for any number of node failures while maintaining original file system file layout. For example, the symmetric server design of a parallel file system also means that as long as at least one file system server is accessible, parallel file access protocol (e.g., pNFS) clients can continue uninterrupted by failing over to other file servers and designating them as metadata managers.

In yet another embodiment, the claimed invention provides for encoding of a file system metadata manager in the file system file handle for easy retrieval of the id of the metadata manager for an opened file on each request to data server. For instance, the file system implementing embodiments of the invention creates the file handle for the parallel file access protocol client to use when a file is opened. In addition to its normal file handle creation procedure, the file system encodes the metadata manager id in the file handle. As a result, any time the parallel file access protocol client uses the file handle to read or write to a file on a data server, that data server knows the id of the metadata manager. This is a simple and efficient mechanism that allows easy identification of the primary owner of the metadata for a file. This mechanism can then be used for distributing parallel file access protocol state between the data servers and metadata managers for authentication and correctness.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "manager," or "system." Furthermore, aspects of the present invention may take the form of a computer program product embodied in one or more computer readable medium(s) having computer readable program code embodied thereon.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
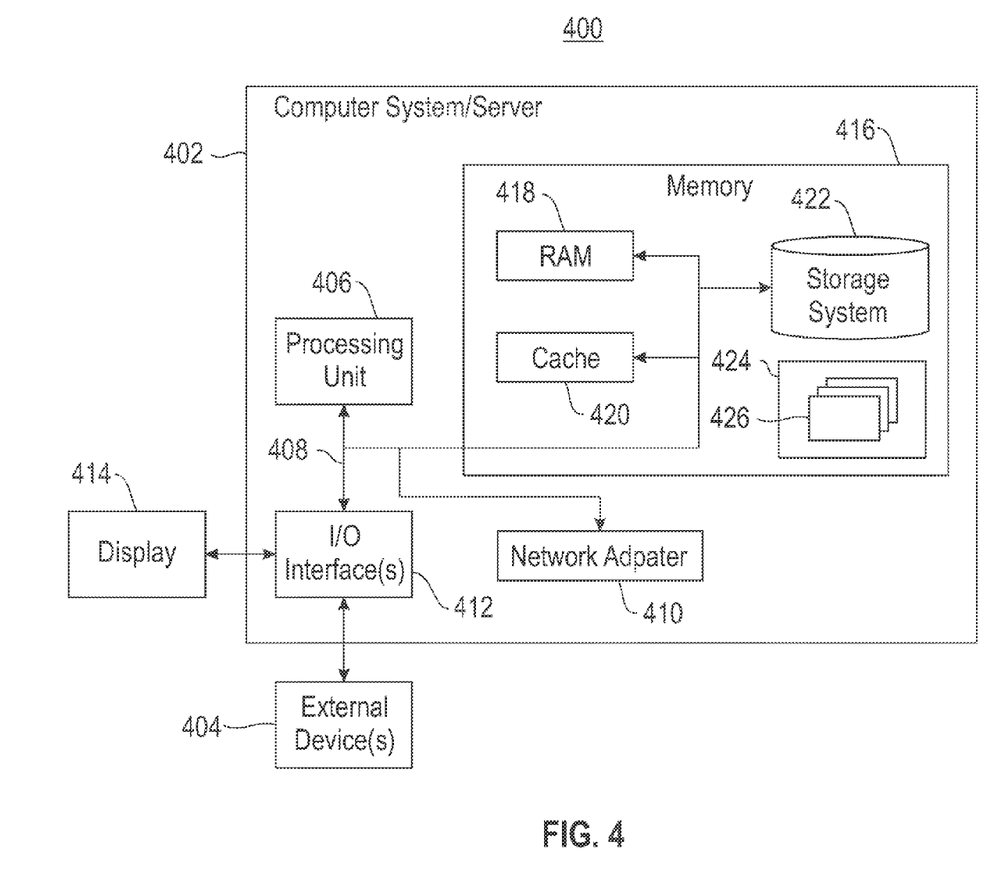
FIG. 4 depicts a block diagram illustrating an exemplary general-purpose computing architecture for implementing embodiments of the present invention.

FIG. 4 depicts a block diagram illustrating an exemplary general-purpose computing architecture (400) for implementing embodiments of the present invention. For example, the computer architecture is suitable as a cloud computing architecture and for implementing and/or performing any of the functionality or embodiments of the invention as described and claimed herein.

The architecture includes a computer system/server (402) (hereinafter "computer"). The components of the computer may include, but are not limited to, one or more processors or processing units (406), a system memory (416), and a bus (408) that couples various system components together, including the system memory to the processing units. The computer can serve as a cloud computing code and is operational with numerous other general purpose or special purpose computing system environments or configurations.

Examples of well-known computing systems, environments, and/or configurations that may be suitable for use with the computer include, but are not limited to: personal computer systems; server computer systems; thin clients; thick clients; hand-held or laptop devices; multiprocessor systems; microprocessor-based systems; set top boxes; programmable consumer electronics; network PCs; minicomputer systems; mainframe computer systems; clustered file systems; file server clusters; scalable storage subsystems; and distributed cloud computing environments that include any of the above systems or devices, and the like.

The bus represents one or more of any of several types of bus structures, including a memory bus or memory controller, a peripheral bus, an accelerated graphics port, and a processor or local bus using any of a variety of bus architectures. By way of example, and not limitation, such architectures include: Industry Standard Architecture (ISA) bus; Micro Channel Architecture (MCA) bus; Enhanced ISA (EISA) bus; Video Electronics Standards Association (VESA) local bus; and Peripheral Component Interconnects (PCI) bus. The computer typically includes a variety of computer system readable media. Such media may be any available media that is accessible by the computer, and it includes both volatile and non-volatile media, removable and non-removable media.

The system memory can include computer system readable media in the form of volatile memory, such as random access memory (RAM) (418) and/or cache memory (420). The computer may further include other removable/non-removable, volatile/non-volatile computer system storage media. By way of example only, a storage system or storage subsystem (422) can be provided for reading from and writing to a permanent storage (not shown and typically called a "hard disk drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the memory may include at least one program product having a set (e.g., at least one) of program modules that are configured to carry out the functions of embodiments of the invention.

The computer may be described in the general context of computer system-executable instructions, such as program modules, being executed by a computer system. Generally, the program modules may include routines, programs, objects, components, logic, data structures, and so on that perform particular tasks or implement particular abstract data types. The computer may be practiced in distributed cloud computing environments where tasks are performed by remote processing devices that are linked through a communications network. In a distributed cloud computing environment, the program modules may be located in both local and remote computer system storage media including memory storage devices.

The program/utility (424), having a set (at least one) of program modules (426), may be stored in the system memory or storage system by way of example, and not limitation, as well as an operating system, one or more application programs, other program modules, and program data. Each of the operating systems, one or more application programs, other program modules, and program data or some combination thereof, may include an implementation of a networking environment. Program modules generally carry out the functions and/or methodologies of embodiments of the invention as described herein.

The computer may also communicate with one or more external devices (404), such as a keyboard, a pointing device, a display (414), etc.; one or more devices that enable a user to interact with the computer; and/or any devices (e.g., network card, modem, etc.) that enable computer to communicate with one or more other computing devices. Such communication can occur via I/O interfaces (412). Still yet, the computer can communicate with one or more networks such as a LAN, a general WAN, and/or a public network (e.g., the Internet) via network adapter (410). As depicted, the network adapter communicates with the other components of the computer via the bus. It should be understood that although not shown, other hardware and/or software components could be used in conjunction with computer. Examples, include, but are not limited to microcode, device drivers, redundant processing units, external disk drive arrays, RAID systems, tape drives, and data archival storage systems, etc.

It is understood in advance that although this Detailed Description includes a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service oriented with a focus on statelessness, low coupling, modularity, and semantic interoperability. At the heart of cloud computing is an infrastructure comprising a network of interconnected nodes. By way of example, the cloud computing model may include at least five characteristics, at least three service models, and at least four deployment models.

Characteristics are as follows:

On-demand self service, where a cloud consumer can unilaterally provision computing capabilities, such as server time and network storage, as needed automatically without requiring human interaction with the service's provider.

Broad network access, where capabilities are available over a network and accessed through standard mechanisms that promote use by heterogeneous thin or thick client platforms (e.g., mobile phones, laptops, and PDAs).

Resource pooling, where the provider's computing resources are pooled to serve multiple consumers using a multi-tenant model, with different physical and virtual resources dynamically assigned and reassigned according to demand. For example, there is a sense of location independence in that the consumer generally has no control or knowledge over the exact location of the provided resources but may be able to specify location at a higher level of abstraction (e.g., country, state, or datacenter).

Rapid elasticity, where capabilities can be rapidly and elastically provisioned, in some cases automatically, to quickly scale out and rapidly released to quickly scale in. For example, to the consumer, the capabilities available for provisioning often appear to be unlimited and can be purchased in any quantity at any time.

Measured service, where cloud systems automatically control and optimize resource use by leveraging a metering capability at some level of abstraction appropriate to the type of service (e.g., storage, processing, bandwidth, and active user accounts). For example, resource usage can be monitored, controlled, and reported providing transparency for both the provider and consumer of the utilized service.

Service Models are as follows:

Software as a Service (SaaS), the capability provided to the consumer is to use the provider's applications running on a cloud infrastructure. The applications are accessible from various client devices through a thin client interface such as a web browser (e.g., web-based e-mail). For example, the consumer does not manage or control the underlying cloud infrastructure including network, servers, operating systems, storage, or even individual application capabilities, with the possible exception of limited user-specific application configuration settings.

Platform as a Service (PaaS), the capability provided to the consumer is to deploy onto the cloud infrastructure consumer-created or acquired applications created using programming languages and tools supported by the provider. For example, the consumer does not manage or control the underlying cloud infrastructure including networks, servers, operating systems, or storage, but has control over the deployed applications and possibly application hosting environment configurations.

Infrastructure as a Service (IaaS), the capability provided to the consumer is to provision processing, storage, networks, and other fundamental computing resources where the consumer is able to deploy and run arbitrary software, which can include operating systems and applications. For example, the consumer does not manage or control the underlying cloud infrastructure but has control over operating systems, storage, deployed applications, and possibly limited control of select networking components (e.g., host firewalls).

Deployment Models are as follows:

Private cloud, the cloud infrastructure is operated solely for an organization. For example, the private cloud may be managed by the organization or a third party and may exist on-premises or off-premises.

Community cloud, the cloud infrastructure is shared by several organizations and supports a specific community that has shared concerns (e.g., mission, security requirements, policy, and compliance considerations). For example, a community cloud may be managed by the organizations or a third party and may exist on-premises or off-premises.

Public cloud, the cloud infrastructure is made available to the general public to a large industry group and is owned by an organization selling cloud services.

Hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

Figure 5:
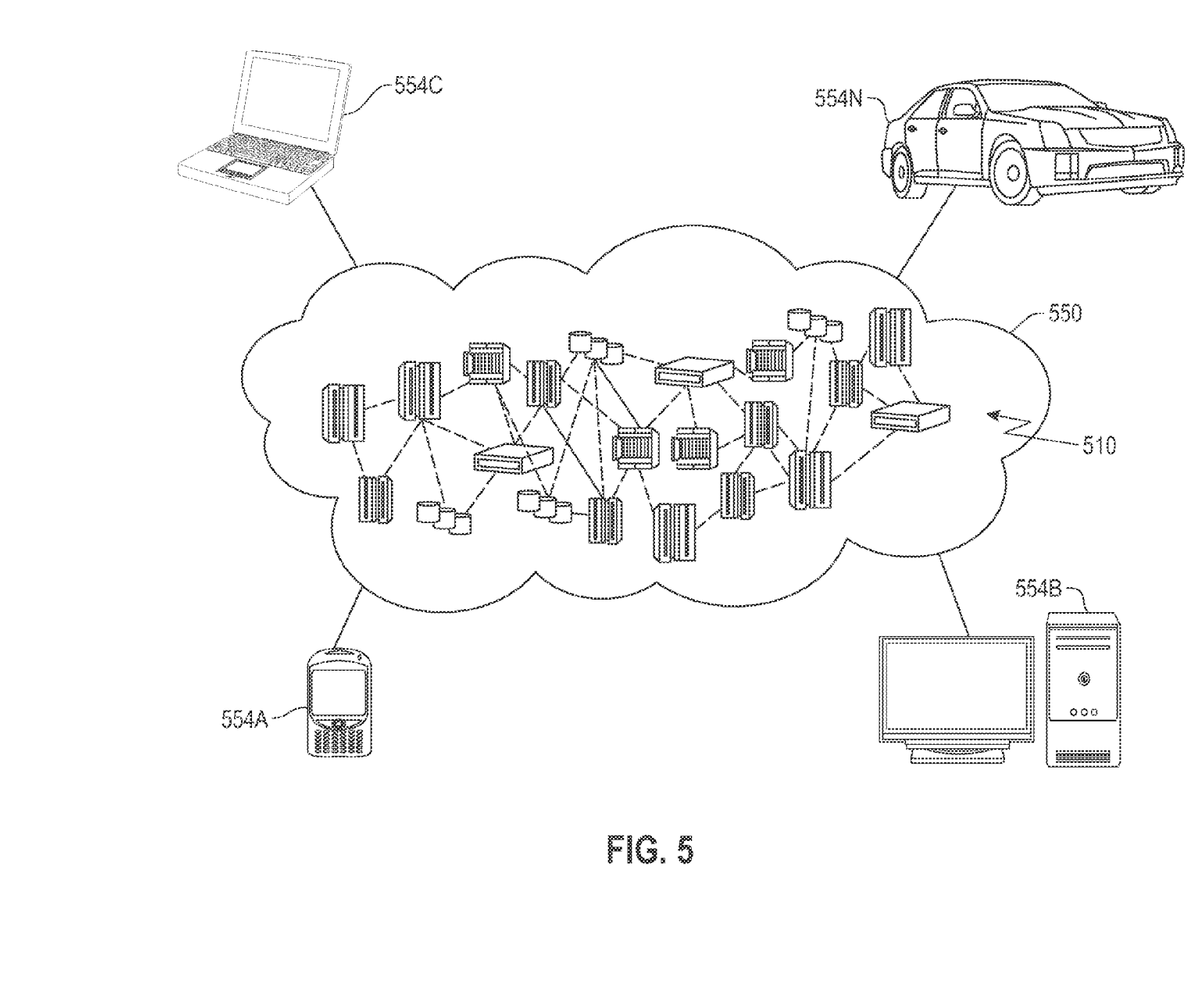
FIG. 5 depicts a block diagram illustrating an exemplary cloud computing environment, according to one embodiment.

FIG. 5 depicts a block diagram illustrating an exemplary cloud computing environment, according to one embodiment. As shown, cloud computing environment 500 comprises one or more cloud computing nodes 502 with which local computing devices used by cloud consumers, such as, for example, personal digital assistant (PDA) or cellular telephone 504a, desktop computer 504b, laptop computer 504c, and/or automobile computer system 504d may communicate. The nodes may communicate with one another. They may be grouped (not shown) physically or virtually, in one or more networks, such as private, community, public, or hybrid clouds as described hereinabove, or a combination thereof. This allows the cloud computing environment to offer infrastructure, platforms and/or software as services for which a cloud consumer does not need to maintain resources on a local computing device. It is understood that the types of computing devices shown in are intended to be illustrative only and that computing nodes and cloud computing environment can communicate with any type of computerized device over any type of network and/or network addressable connection (e.g., using a web browser).

Figure 6:
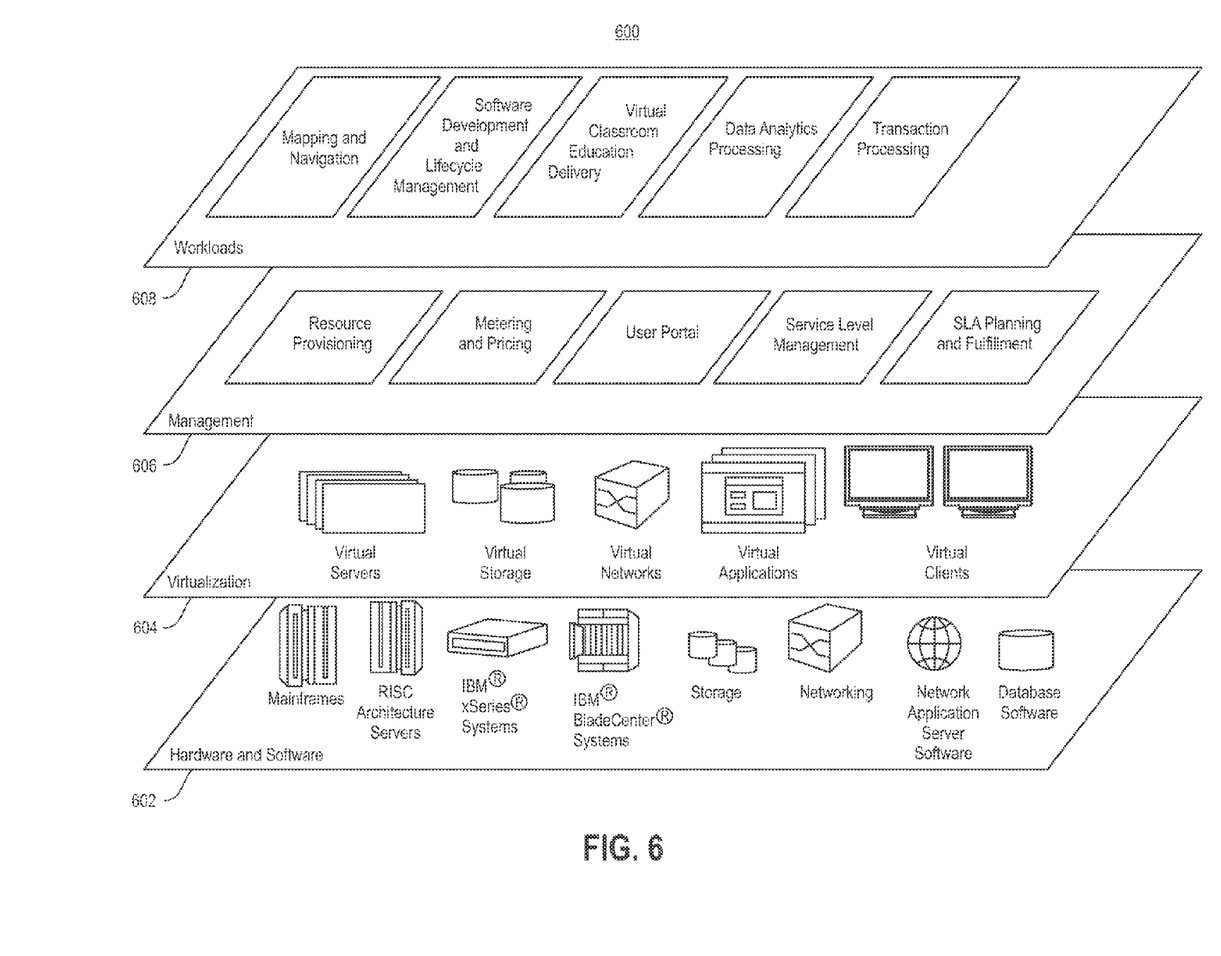
FIG. 6 depicts a block diagram illustrating exemplary abstraction model layers, according to one embodiment.

FIG. 6 depicts a block diagram illustrating exemplary abstraction model layers, according to one embodiment. It should be understood in advance that the components, layers, and functions shown in FIG. 8 are intended to be illustrative only and embodiments of the invention are not limited thereto. As depicted, the following layers and corresponding functions are provided:

Hardware and software layer 602 includes hardware and software components. Examples of hardware components include: mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include: network application server software; in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 604 provides an abstraction layer from which the following examples of virtual entities may be provided: virtual servers; virtual storage; virtual networks, including virtual private networks; virtual applications and operating systems; and virtual clients.

In one example, management layer 606 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 608 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to data item identification, including, but not limited to, supporting coordinated access to the file system's shared disk storage subsystem using an automatic alignment of a parallel file access protocol and metadata management on a per object basis of the file system's storage subsystem.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments of the invention have been described herein for purposes of illustration, various modifications may be made without departing from the spirit and scope of the invention. In particular, the system can be configured to support creation of consistency point associated with a virtual machine. Accordingly, the scope of protection of this invention is limited only by the following claims and their equivalents.

What we claim is:

1. A method of supporting coordinated access to a file system's shared disk storage subsystem using an automatic alignment of a parallel file access protocol and metadata management on a per object basis of said storage subsystem, wherein active file servers in a cluster have equivalent access to shared data of said file system, the method comprising:
    in response to a client's request to access a file stored by said file system in said storage system using a parallel file access protocol:
        if said file system has selected a metadata manager of said file, using said metadata manager to coordinate access to said file's metadata,
        if said file system has not selected a metadata manager of said file, selecting the file server that received said request as the metadata manager for said file until a file close request operation is received,
    performing a file open request operation for said file to the selected metadata manager, said performing being done by a file server that received said request;

opening said file and creating a file handle of said file,
encoding a file server ID, of the file server selected as the metadata manager of said file, in the file handle such that said file system's file servers are enabled to identify which file server is said file's metadata manager,
returning the file handle to said client for performing I/O to said file;
if the file server that received said client's request is not the metadata manager and a metadata manager already exists for the file but no clients have said file open, migrating the metadata management from the file server, previously selected as the metadata manager of said file, to a file server in the cluster that at least one client has said file open.

2. The method of claim 1, wherein having a metadata manager selected thereby allows said client to access different metadata managers for different files, such that metadata management can be distributed across the file system's file servers.

3. The method of claim 1, further comprising:
receiving a metadata access request for said file's metadata from said client; and
coordinating the access for said file's metadata through said metadata manager.

4. The method of claim 1, further comprising:
in response said client's I/O request to said file, the file server receiving the I/O request:
retrieving said file server ID of the metadata manager, by decoding said file handle,
retrieving any required metadata from the file server, selected as the metadata manager of said file, to determine if said client has permission to perform I/O to said file, and
if said client has permission to perform I/O to said file, caching the retrieved metadata and executing the requested I/O request.

5. The method of claim 4, wherein said client does not have said permission, if either: (i) access control fails for a user of said client, or (ii) said client attempts to perform a type of operation not in accordance with file system security policies.

6. The method of claim 1, further comprising:
in response said client's request to close said file, the file server that received said request, uses an inter-node communication mechanism to remove cached metadata on said file system's file servers.

7. The method claim 1, further comprising:
in response said client's request for a file access layout of said file, the file server receiving the I/O request, returns a file access layout of said file to said client for said protocol to use to service the I/O request; and
wherein said layout includes a set of file servers in said cluster and byte ranges of said file, the byte-range being associated with a particular server among said file system's file servers.

8. A file system of supporting coordinated access to the file system's shared disk storage subsystem using an automatic alignment of a parallel file access protocol and metadata management on a per object basis of said storage subsystem, said file system comprising:
a shared disk storage subsystem that stores said file system's shared data;
a plurality of file servers in a cluster, each of the file servers that are active having equivalent access to the shared data, wherein a particular file server (among said servers) is configured to manage metadata for a particular file; and
wherein a file server, among said servers, receives a client's request to access a file stored by said file system in said storage subsystem using a parallel file access protocol:
if said file system has selected a file server to serve as a metadata manager of said file, using the selected file server to coordinate access to said file's metadata,
if said file system has not selected a file server to serve as the metadata manager of said file, selecting the file server that received said request as the metadata manager for said file until a file close request operation is received, and
said server that received the client's request: (i) performing a file open request operation for said file, to the file server selected to serve as the metadata manager, (ii) opens said file and creates a file handle of said file, (iii) encodes a file server ID, of the file server selected as the metadata manager of said file, in the file handle such that said file system's file servers may identify which file server is said file's metadata manager, and (iv) returns the file handle to said client for performing I/O to said file;
wherein if the file server that received said client's request is not the metadata manager and a metadata manager already exists for the file but no clients have said file open, the file system migrates the metadata management from the file server, previously selected as the metadata manager of said file, to a file server in the cluster that at least one client has said file open.

9. The file system of claim 8, wherein if the file system receives a metadata access request for said file's metadata from said client, said file system coordinates the access for said file's metadata through the file server selected as the metadata manager.

10. The file system of claim 8, wherein in response said client's I/O request to said file, the file server that received the I/O request:
retrieves said file server ID of the metadata manager, by decoding said file handle,
retrieves any required metadata from the file server, selected as the metadata manager of said file, to determine if said client has permission to perform I/O to said file, caches the retrieved metadata, and
executes the requested I/O request.

11. The file system of claim 8, further comprising:
in response said client's request to close said file, the file server that received said request, uses an inter-node communication mechanism to remove cached metadata on said file system's file servers.

12. The file system of claim 8, further comprising:
in response said client's request for a file access layout of said file, the file server receiving the I/O request, returns a file access layout of said file to said client for said protocol to use to service the I/O request; and
wherein said layout includes a set of file servers in said cluster and byte ranges of said file, the byte-range being associated with a particular server among said file system's file servers.

13. A computer program product of supporting coordinated access to a file system's shared disk storage subsystem using an automatic alignment of a parallel file access protocol and metadata management on a per object basis of said storage subsystem, wherein active file servers in a cluster have equivalent access to shared data of said file system, said program product comprising a non-transitory computer readable storage medium having computer usable program code embodied therewith, said program code being readable/executable by a file system to:

in response to a client's request to access a file stored by said file system in said storage system using a parallel file access protocol:
  if said file system has selected a metadata manager of said file, use said metadata manager to coordinate access to said file's metadata;
  if said file system has not selected a metadata manager of said file, select the file server that received said request as the metadata manager for said file until a file close request operation is received;
  perform a file open request operation for said file to the selected metadata manager, said performing being done by a file server that received said request;
  open said file and create a file handle of said file;
  encode a file server ID, of the file server selected as the metadata manager of said file, in the file handle such that said file system's file servers may identify which file server is said file's metadata manager; and
  return the file handle to said client for performing I/O to said file.
if a file system file server that received said client's request is not the metadata manager and a metadata manager already exists for the file but no clients have said file open, migrate the metadata management from the file server, previously selected as the metadata manager of said file, to a file server in the cluster that at least one client has said file open.

14. The computer program product of claim 13, said program code further configured to:
  receive a metadata access request for said file's metadata from said client; and
  coordinate the access for said file's metadata through said metadata manager.

15. The computer program product of claim 13, said program code further configured to:
  in response said client's I/O request to said file, the file server receiving the I/O request:
    retrieve said file server ID of the metadata manager, by decoding said file handle,
    retrieve any required metadata from the file server, selected as the metadata manager of said file, to determine if said client has permission to perform I/O to said file,
    cache the retrieved metadata, and
    execute the requested I/O request.

16. The computer program product of claim 13, said program code further configured to:
  in response said client's request to close said file, the file server that received said request, uses an inter-node communication mechanism to remove cached metadata on said file system's file servers.

17. The computer program product of claim 13, said program code further configured to:
  in response said client's request for a file access layout of said file, the file server receiving the I/O request, returns a file access layout of said file to said client for said protocol to use to service the I/O request; and
  wherein said layout includes a set of file servers in said cluster and byte ranges of said file, the byte-range being associated with a particular server among said file system's file servers.

* * * * *